United States Patent
Fischer

(10) Patent No.: US 8,582,508 B2
(45) Date of Patent: *Nov. 12, 2013

(54) CELL SITE CONTENT CACHING

(75) Inventor: Steve Fischer, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 118 days.

This patent is subject to a terminal disclaimer.

(21) Appl. No.: 13/246,825

(22) Filed: Sep. 27, 2011

(65) Prior Publication Data

US 2012/0020274 A1    Jan. 26, 2012

Related U.S. Application Data

(63) Continuation of application No. 12/170,340, filed on Jul. 9, 2008, now Pat. No. 8,060,145.

(51) Int. Cl.
*H04W 4/00* (2009.01)
*H04B 7/212* (2006.01)

(52) U.S. Cl.
USPC .................... 370/328; 370/347; 455/422.1

(58) Field of Classification Search
USPC ............ 370/328–348; 455/426.2, 550.1–555, 455/561–562.1, 421–422, 432.1–435.11
See application file for complete search history.

(56) References Cited

U.S. PATENT DOCUMENTS

| 6,757,712 B1 | 6/2004 | Bastian et al. |
| 6,766,422 B2 | 7/2004 | Beyda |
| 6,807,415 B2 * | 10/2004 | Sato .............................. 455/420 |
| 2004/0133486 A1 * | 7/2004 | Markki et al. .................. 705/34 |
| 2008/0304441 A1 * | 12/2008 | Tsirtsis et al. ................ 370/328 |
| 2009/0059848 A1 * | 3/2009 | Khetawat et al. ............. 370/328 |
| 2009/0265366 A1 * | 10/2009 | Marshall-wilson et al. .. 707/100 |
| 2009/0305699 A1 * | 12/2009 | Deshpande et al. .......... 455/434 |
| 2010/0008290 A1 | 1/2010 | Fischer |

OTHER PUBLICATIONS

"73.624 Digital television broadcast stations," 47 CFR Ch.1, Oct. 1, 2004, Edition, 4 pages.
"Google Plan Would Open TV Band for Wireless Use," Bloomberg News, Mar. 25, 2008, 2 pages.
"Statistical Multiplexing," Wikipedia, Jun. 11, 2008, 2 pages.

* cited by examiner

*Primary Examiner* — Thai Hoang
(74) *Attorney, Agent, or Firm* — Perkins Coie LLP

(57) ABSTRACT

Systems, apparatus, methods, and manufactures for caching content at a communications services cell site which include caching previously provided content and/or predictively caching content. Content may be transmitted to cell sites for caching via primary or ancillary channels. Ancillary channels may be provided through a broadcast medium such as the ancillary or supplementary services spectrum of the digital television (DTV) spectrum. Content may also be broadcast to multiple cell sites simultaneously.

22 Claims, 4 Drawing Sheets

CELL SITE CONTENT CACHING

CROSS-REFERENCE TO RELATED APPLICATION

This application is a Continuation of U.S. patent application Ser. No. 12/170,340 filed Jul. 9, 2008 and entitled "CELL-SITE CONTENT CACHING," which is hereby incorporated by reference in its entirety.

BACKGROUND

The popularity of mobile data services has substantially increased during recent years. For example, mobile device users may utilize mobile data services to obtain content (e.g., download ring tones, download pictures, download games, browse the Internet, download or stream multimedia content, and/or the like). Likewise, the increasing availability of third-generation mobile technologies such as Universal Mobile Telecommunications System (UMTS) and Evolution-Data Optimized (EVDO) is generating demand for high-bandwidth and low-latency content delivery.

With typical wireless communications systems, cell sites (e.g., base stations, Node-Bs, etc.) are employed to provide a network interface to mobile devices. Many cell sites may be positioned at distributed locations to provide network coverage throughout a geographical area. In certain systems, these cell sites provide low-level radio interfacing between mobile devices and back-end infrastructure and are coupled to a back-end controller (e.g., a base station controller and/or a radio network controller) over a backhaul. The back-end controllers may control operational aspects (e.g., control handoffs, handle registration of mobile devices to the network, allocate channels, control radio transmitter output power, etc.) for multiple cell sites and may provide network interfaces to networks such as public switched telephone networks, the Internet, and/or other data networks.

Typically, one or more T1 lines are employed for each cell site's backhaul. While T1 lines typically provide sufficient bandwidth for voice traffic and relatively low-bandwidth data applications, many new mobile data services may benefit from higher bandwidth and/or lower latency interfaces. However, adding additional T1 lines and/or upgrading T1 lines to T3 lines may increase operating costs and/or require capital expenditure.

DETAILED DESCRIPTION

Overview

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

As one nonlimiting example, the technology may be employed to cache content at a communications system facility such as a wireless communications service cell site. Any content including commonly requested and/or popular content such as ring tones, pictures, games, web pages, multimedia content, advertisements, firmware updates, software, software updates, and/or the like may be cached at these facilities. In addition, the content may be stored as digital files such as image files, video files, sound files, and/or the like. The facilities may then provide the cached content to mobile devices without backhaul-related delays. For example, content caching may be employed to improve performance characteristics such as bandwidth, throughput, latency, cell site capacity, and/or the like.

High-speed third-generation (3G) wireless networks are now being deployed. In certain situations, backhaul limitations impact the effective performance characteristics in these systems and environments. Adding ancillary channels to backhauls may provide additional content transfer capabilities. A digital television (DTV) ancillary channel is one example of an ancillary channel that may be utilized to transfer content to a cell site. Specifically, 47 C.F.R. §73.624(c) allows broadcasters to provide ancillary or supplementary services over ancillary channels in excess DTV spectrum. As another nonlimiting example, the technology may be utilized to broadcast content to cell sites over excess DTV spectrum.

Figure 1:
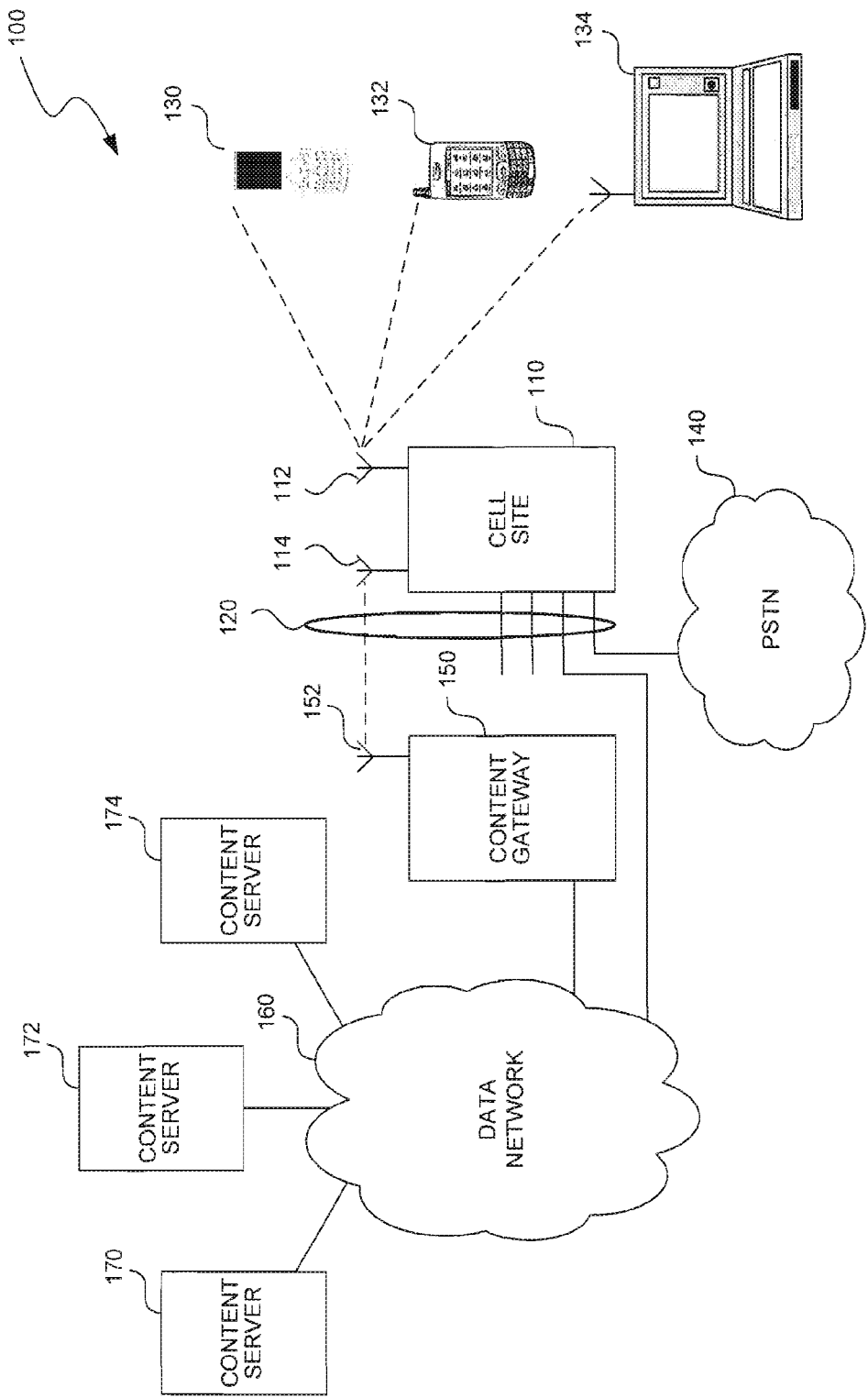
FIG. 1 is a diagram of a suitable environment for practicing aspects of the invention.

In conjunction with FIG. 1, this Detailed Description describes environments in which aspects of the invention may be practiced. The text accompanying FIG. 2 describes communications systems usable in the environment of FIG. 1. Finally, the text accompanying FIGS. 3 and 4 describes processes for practicing aspects of the invention.

Illustrative Environments

FIG. 1 illustrates a suitable environment in which the invention may be practiced. Environment 100 includes cell site 110, mobile devices 130, 132, and -134, public switched telephone network (PSTN) 140, content gateway 150, data network 160, and content servers 170, 172, and 174. As shown, cell site 110 is configured to wirelessly communicate with mobile devices 130, 132, and 134 via antenna 112 and to communicate with PSTN 140, content gateway 150, and data network 160 via backhaul 120. Further, backhaul 120 may also include an ancillary wireless channel between antenna 114 of cell site 110 and antenna 152 of content gateway 150. While FIG. 1 illustrates one example of a suitable environment in which the invention may be practiced, various modifications such as inclusion of additional devices, consolidation and/or deletion of various devices, and shifting of functionality from one device to another device may be made without deviating from the invention.

Cell site 110 may include virtually any device for facilitating wireless network access. For example, cell site 110 may be a wireless telephony base station, a wireless network access base station, a wireless email base station, and/or the like. As an example, cell site 110 may be operated by a mobile telephony service provider. Generally, cell site 110 is configured to facilitate wireless network access for mobile devices 130, 132, and 134 by providing an interface (via antenna 112) between mobile devices 130, 132, and 134 and backhaul 120.

Cell site 110 and mobile devices 130, 132, and 134 may communicate using any wireless protocol or standard. These include, for example, Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), and/or the like. Cell site 110 may also be configured to locally cache content and/or receive content over one or more ancillary channels.

Backhaul 120 may communicatively couple cell site 110 to PSTN 140, content gateway 150, and data network 160 via primary and/or ancillary channels. As one example, primary channels include one or more T1 connections, T3 connections, OC3 connections, frame relay connections, Asynchronous Transfer Mode (ATM) connections, microwave connections, Ethernet connections, Token-Ring connections, Digital Subscriber Line (DSL) connections, and/or the like. Primary channels may, for example, be employed to provide time-sensitive or real-time voice and/or data communications to PSTN 140 and/or data network 160. However, primary channels may also be employed for time-insensitive communications.

Backhaul 120 may also include one or more ancillary channels to provide content to cell site 110. For example, ancillary channels may be employed to provide time-insensitive communications to cell site 110. Such communications may include content to be cached at cell site 110 and/or content requested by mobile devices 130, 132, and 134. In certain environments, ancillary channels may also provide time-sensitive and/or real-time communications to cell site 110.

Ancillary channels may include wireless and/or wired channels. For example, wireless communications channels may include a wireless communications channel between antenna 114 of cell site 110 and antenna 152 of content gateway 150. An ancillary channel may include either a unidirectional or bidirectional channel, As discussed above, ancillary channels may be provided over the ancillary or supplementary services spectrum of the DTV spectrum. However, WiMAX channels, frequency modulated (FM) radio sideband channels, any other licensed or unlicensed wireless channel, any point-to-point or point-to-multipoint channel, and/or the like may also be suitably employed.

Ancillary channels may also employ other wired or wireless channels employing any of the technologies discussed in reference to primary channels. Ancillary channels also include logical and/or virtual channels provided over the primary channels of backhaul 120. Logical and/or virtual ancillary channels may employ quality of service, statistical multiplexing, dynamic bandwidth allocation, and/or other techniques to transfer, for example, time-insensitive content to cell site 110 via excess primary channel bandwidth.

Mobile devices 130, 132, and -134 may include virtually any devices for communicating over a wireless network, PSTN 140, and/or data network 160. Such devices include cellular telephones, GSM telephones, TDMA telephones, UMTS telephones, EVDO telephones, LTE telephones, Personal Digital Assistants (PDAs), radio frequency (RF) devices, infrared (IR) devices, handheld computers, laptop computers, wearable computers, tablet computers, pagers, integrated devices combining one or more of the preceding devices, and/or the like. As such, mobile devices 130, 132, and -134 range widely in terms of capabilities and features. For example, a cellular telephone may have a numeric keypad and the capability to display only a few lines of text. However, other cellular telephones (e.g., smart phones) may have a touch-sensitive screen, a stylus, and a relatively high-resolution display.

Various users may employ mobile devices 130, 132, and 134 to communicate with other users or devices. In addition, users may employ mobile devices 130, 132, and 134 to browse, download, view, or otherwise interact with content.

Mobile devices 130, 132, and 134 may typically include a processing unit, volatile memory and/or nonvolatile memory, a power supply, one or more network interfaces, an audio interface, a display, a keypad or keyboard, a Global Positioning System (GPS) receiver and/or other location determination device, and other input and/or output interfaces (not shown). Also, the various components of mobile devices 130, 132, and 134 may be interconnected via a bus.

The volatile and nonvolatile memories generally include computer storage media for storing information such as computer readable instructions, data structures, program modules, or other data. Some examples of information that may be stored include basic input/output systems (BIOS), operating systems, and applications. In addition, the memories may be employed to store operational data, content, contexts, and/or the like.

The memories may also store one or more client applications configured to receive and/or provide messages from and/or to another computing device. These messages may also be displayed and/or stored on mobile devices 130, 132, and 134. In addition, the messages may include short message service (SMS) messages, multi-media message service (MMS) messages, IM messages, enhanced message service (EMS) messages, and/or any other content directed towards a user of mobile devices 130, 132, and 134.

PSTN 140 is configured to provide interconnectivity between mobile devices 130, 132, and 134 and other telecommunications devices. For example, PSTN 140 may be employed to provide circuit-switched audio communications between various telecommunications devices. However, in other systems, PSTN 140 may include Voice Over Internet Protocol (VOIP) networks, private telecommunications networks, and/or the like. Also, PSTN 140 may include devices such as 5ESS switches, Private Branch Exchange (PBX) switches, base station controllers, and/or the like.

Content gateway 150 may include any device configured to retrieve and forward content from content servers 170, 172, and 174 to cell site 110. Suitable devices include any computing device capable of communicating with cell site 110 and data network 160. Devices that may operate as content gateway 150 include proxy servers, personal computers, desktop computers, multiprocessor systems, microprocessor-based or programmable consumer electronic devices, servers, and/or the like. As shown, content gateway 150 is also configured to wirelessly provide content to cell site 110 via antenna 152. While shown in FIG. 1, content gateway 150 may be omitted in some environments.

Data network 160 is configured to interconnect various computing devices such as cell site 110, mobile devices 130, 132, and 134, content gateway 150, and content servers 170, 172, and 174 to each other and to other resources. In addition, data network 160 may include any number of wired and/or wireless networks including the Internet, intranets, local area networks (LANs), metropolitan area networks (MANs), wide area networks (WANs), direct connections, and/or the like. In one environment, data network 160 is the Internet. Additional computing devices such as routers, network switches, hubs, modems, firewalls, gateways, radio network controllers, proxy servers, access points, base stations, and/or the like may be employed to facilitate communications in data network 160. Further, the various computing devices may employ any of the protocols and standards discussed above.

Content servers 170, 172, and 174 may include any devices configured to provide content (directly or indirectly) to mobile devices 130, 132, and 134. Suitable devices include any computing device capable of providing content to cell site 110, mobile devices 130, 132, and 134, content gateway 150, or to any other device. For example, content servers 170, 172, and 174 may include web servers, File Transfer Protocol (FTP) servers, Network Time Protocol (NTP) servers, Internet Relay Chat (IRC) servers, Simple Mail Transport Protocol (SMTP) servers, and/or the like. Devices that may operate as content servers 170, 172, and 174 include personal computers, desktop computers, multiprocessor systems, microprocessor-based or programmable consumer electronic devices, servers, and/or the like.

Illustrative Communications System

Figure 2:
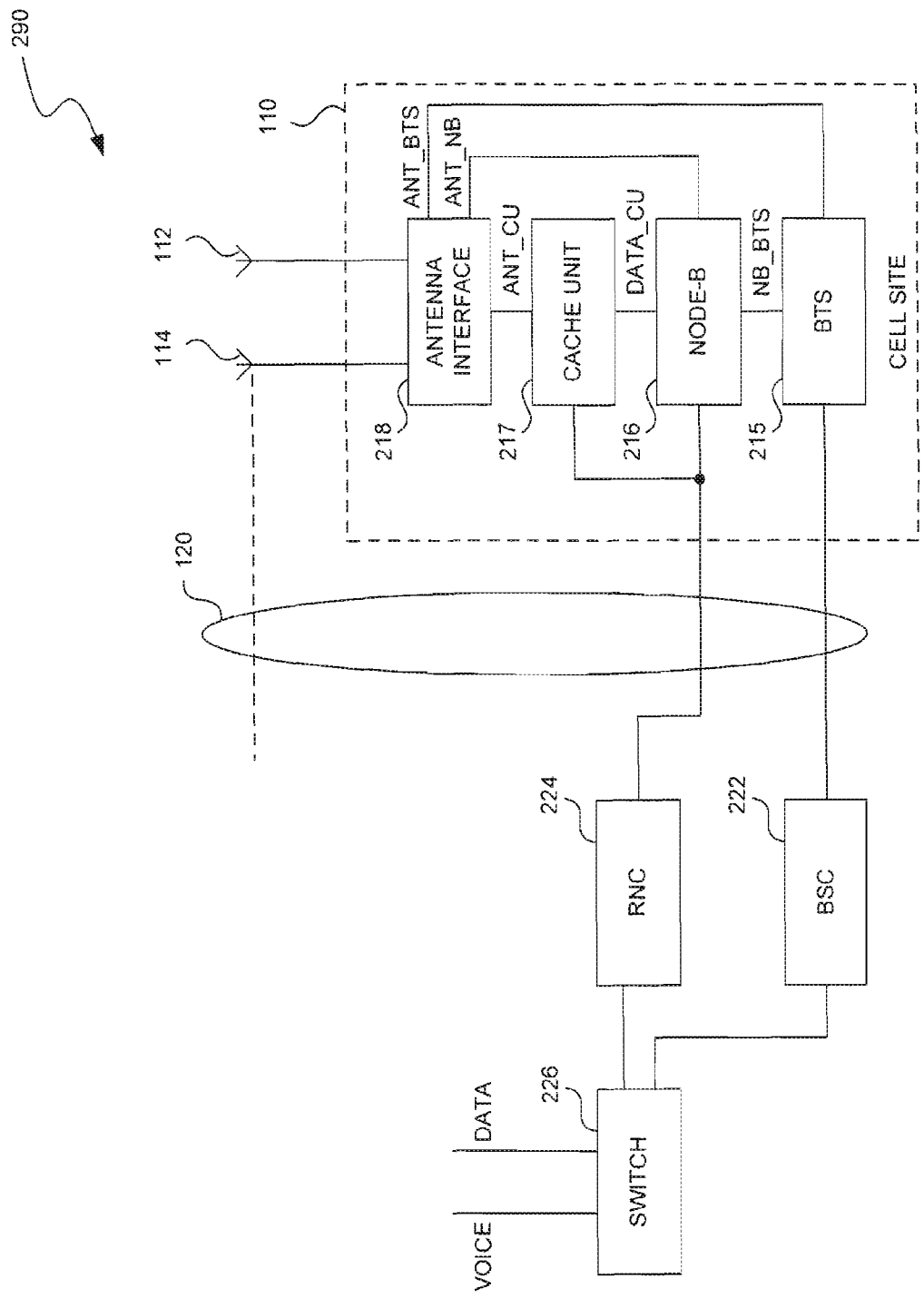
FIG. 2 is a block diagram of a communications system usable in the environment of FIG. 1.

FIG. 2 is a block diagram of communications system 290. Communications system 290 includes cell site 110, base station controller (BSC) 222, radio network controller (RNC) 224, and switch 226. Cell site 110 includes base station (BTS) 215, Node-B 216, cache unit 217, and antenna interface 218. While communications system 290 is illustrated as a GSM/UMTS communications system, the invention is not limited to GSM/UMTS communications systems. Any suitable communications system may employ all or part of the invention.

BSC 222 may be coupled between switch 226 and cell site 110 to control certain operational aspects of BTS 215. For example, BSC 222 may be configured to control handoffs, network registration for mobile devices, channel allocation, radio transmitter output power, and/or the like. BSC 222 may be employed to control any number of base stations.

RNC 224 may be coupled between switch 226 and cell site 110 to control certain operational aspects of Node-B 216 of cell site 110. Also, RNC 224 may be employed to control any number of Node-Bs. As an example, RNC 224 may be a UMTS counterpart of BSC 222. In addition, RNC 224 may also include a content gateway such as content gateway 150 of FIG. 1. In such an example, RNC 224 may be coupled to cell site 110 via both primary and ancillary channels.

Switch 226 is configured to provide voice and data interfaces, respectively, to BSC 222 and RNC 224. For example, switch 226 may be configured to switch voice traffic from one or more base station controllers to a PTSN or to a telephone switch such as a 5ESS switch, a PBX switch, and/or the like via signal VOICE. Likewise, switch 226 may be further configured to switch data from one or more RNCs to a data network, to a router, to another switch, and/or the like via signal DATA. Also, switch 226 may include a mobile switching center (MSC), a media gateway, a call gateway, and/or the like.

Switch 226 may also be coupled to an operations and maintenance center (OMC) that is configured to provide a centralized platform from which a wireless communications service provider may monitor and control operational aspects of the elements of communications system 290. Further, switch 226 may also include or further operate as a content gateway such as content gateway 150 of FIG. 1. In such an example, switch 226 may be coupled to cell site 110 via both primary and ancillary channels.

As stated above, cell site 110 may include BTS 215, Node-B 216, cache unit 217, and antenna interface 218. In typical communications systems, BTS 215 and Node-B 216 are configured to provide a low-level radio interface to mobile devices under the control of BSC 222 and RNC 224. For example, BTS 215 may provide low-level GSM radio interfacing while Node-B 216 provides low-level UMTS radio interfacing. Also, cell site 110 may include limited command and control functionality or no command and control functionality. Instead, BSC 222 and/or RNC 224 may provide such functionality while cell site 110 merely provides a physical layer interface to associated mobile devices.

Cell site 110 may also include cache unit 217 to locally cache content. For example, cache unit 217 may include one or more proxy servers, gateways, data portals, and/or any other servers configured to receive, store, and forward content. As discussed below, cache unit 217 and/or other devices may employ predicative and/or statistical caching techniques, may cache previously requested content, may cache manually uploaded content, and/or the like.

Cell site 110 may also include antenna interface 218 to interface BTS 215, Node-B 216, and cache unit 217 to antennas 112, and 114. Antenna interface 218 may also include a smart bias tee that is configured to physically interface the RF signals among of BTS 215, Node-B 216, cache unit 217, and antennas 112, and 114. A smart bias tee may be further adapted to provide power to receiver preamplifiers in antenna 112 and/or antenna 114.

In other examples, antenna interface 218 may include duplexers, diplexers, multiplexers, and/or the like. Also, antenna interface 218 may be omitted in certain cell sites. For example, BTS 215 may be configured to receive RF signals from Node-B 216 and/or cache unit 217 and couple these and other RE signals to antennas 112, and 114.

Illustrative Logical Flow Diagrams

Figure 3:
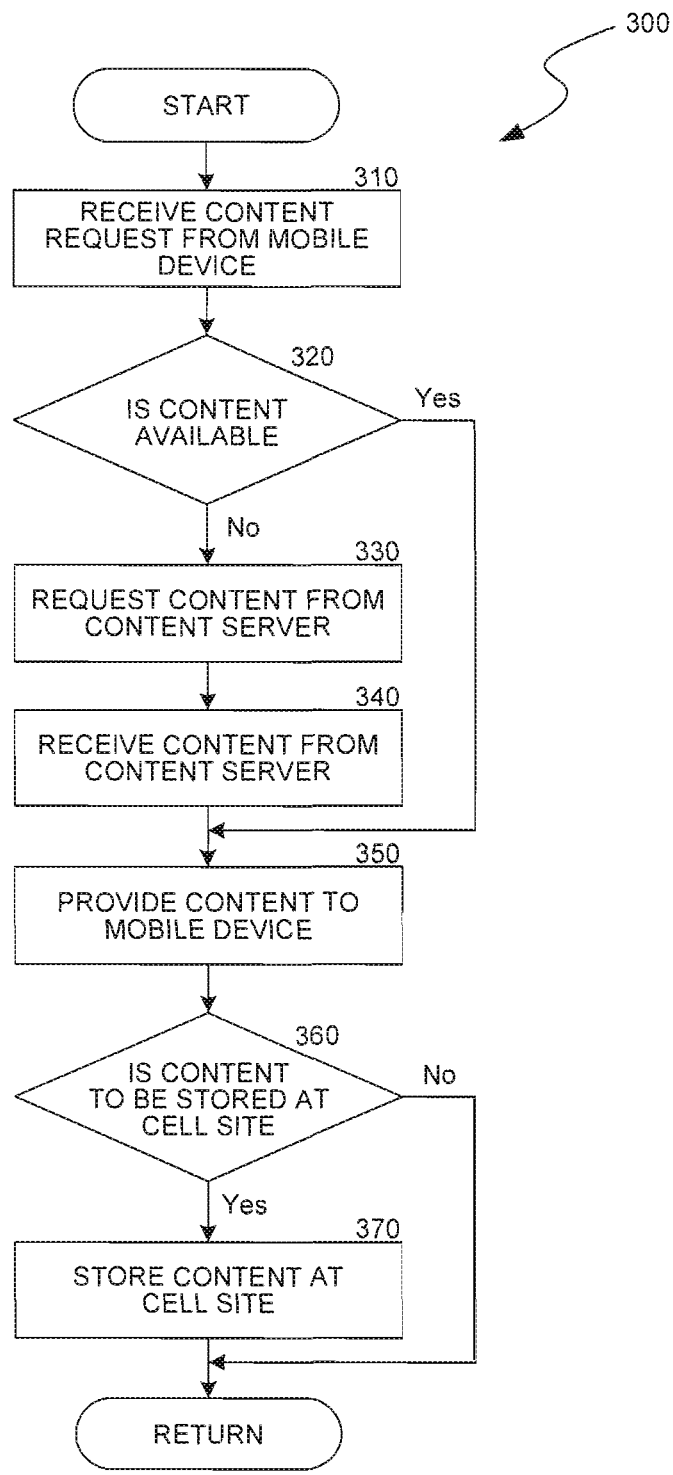
FIG. 3 is a logical flow diagram of a process for providing content to a mobile device.

FIG. 3 is a logical flow diagram of process 300 for providing content to a mobile device. For clarity, process 300 is described below as being performed by particular elements of environment 100 of FIG. 1 or communications system 290 of FIG. 2. However, process 300 may also be, for example, performed by other processors, by other elements, or in other systems whether or not such processors, elements, or systems are described herein. In addition, process 300 may be stored in nonvolatile memory.

Process 300 includes a process for providing content to a mobile device based, at least in part, on whether the content is locally available at a cell site with which the mobile device is associated. As one example, process 300 is primarily performed by elements of cell site 110. However, the performance of process 300 and the steps thereof is not restricted in this manner.

Flowing from a starting block, processing begins at step 310 where cell site 110 receives a content request from, for example, mobile device 130. From step 310, processing flows to decision block 320 where cell site 110 determines whether the requested content is available. Availability of the requested content may be based, at least in part, on whether the requested content is stored in cache unit 217 or is otherwise locally available to cell site 110. Cache unit 217, Node-B 216, and/or any other component may make this determination.

If the requested content is not available, processing flows to step 330 where cell site 110 requests the content from a content server. As discussed above, cell site 110 may request the content from any of content servers 170, 172, and 174. Cell site 110 may request content delivery via primary channels, ancillary channels, content gateway 150, switch 226, RNC 224, and/or the like. As one example, either Node-B 216 or cache unit 217 of cell site 110 may request content from, for example, content server 170 for delivery over an ancillary channel. The location of the requested content may be determined by cell site 110 or may be included in the request from mobile device 130.

From step 330, processing flows to step 340 where cell site 110 receives the requested content from, for example, content server 170. In one example, the content is received at cell site 110 by Node-B 216. However, in other examples, the content may also be received by cache unit 217 and then forwarded to Node-B 216.

From step 340, processing flows to step 350. Also, if cell site 110 determines that the requested content is available, processing may flow directly from decision block 320 to step 350. At step 350, the cell site provides the content to the mobile device. Providing the content to the mobile device may include transferring the entirety of the contents from cell site 110 to mobile device 130 at one time, streaming the content, and/or the like.

Processing then flows to decision block 360 where cell site 110 determines whether the requested content is to be stored at the cell site. As discussed above, storing the requested content at the cell site may enable cell site 110 to provide the content to other requesting mobile devices without backhaul related delays or consuming backhaul bandwidth. Any suitable techniques or factors may be employed to determine whether the content is to be stored at cell site 110.

As an example, predictive caching may be employed to determine whether another request for the same content is likely. Predictive caching determinations may employ any number of techniques or methods. For example, it may include analysis of previous content requests (e.g., how many times has the particular content been requested in the last day, week, or hour; whether the similar content has been previously requested; and/or the like). Predictive caching may also be based, at least in part, on operator configurations such as instructions to cache all top 40 songs, instructions to purge content that has not been requested for at least a day, and/or the like. Statistical analysis may also be employed to determine an expected time and/or bandwidth cost of not caching the received content and to determine if content requests are likely based, at least in part, on any number of factors.

Other criteria may also be employed. For example, expected content requests may also be based, at least in part, on historical data and/or news. For example, third-party information regarding newly released and/or popular ring tones, music (e.g., top 40, award-winning), software updates, publicized content, promotional content, weather, movie reviews, information regarding previous content requests after news releases, and/or the like may be employed to determine expected content requests. Predictive caching may also be based, at least in part, on network conditions such as the available bandwidth, latency, quality of service, and/or the like of a primary channel and/or ancillary channel. In addition, the size of the received content may be another factor which may be considered. For example, content over ¼ Megabyte may be stored while smaller content may not be stored. However, any suitable threshold may be employed.

Also, the storage space available in cache unit 217 may be considered at decision block 360. For example, if cache unit 217 is relatively empty, virtually all received content may be locally stored. However, if cache unit 217 is relatively full, other criteria may be employed to limit the content stored in cache unit 217. In addition, cache unit 217 may also manage storage (e.g., purge old and/or unused content). For example, cache unit 217 may purge content based, at least in part, on the length of time since the content was last requested, the length of time the content has been stored in cache unit 217, the size of the content, and/or any other factors, including those discussed above.

Node-B 216, cache unit 217, and/or another component may determine whether the content is to be stored locally at cell site 110. However, this determination may also be made external to cell site 110. For example, content gateway 150, RNC 224, switch 226, an OMC, and/or the like may determine whether the content is to be stored at cell site 110. Determinations may also be based, at least in part, on network usage, content requests, and other information for a market area, for a geographical area, or for all or part of a wireless service provider's network. For example, an OMC and/or a network operator may collect data from multiple cell sites and employ that data to determine whether the content is to be stored locally at each cell site.

While the above discussion of step 360 provides a number of suitable techniques and factors for determining whether the content is to be stored at cell site 110, the discussion is not a comprehensive list of suitable techniques and factors. Other techniques and factors may be suitably employed and/or considered.

If the content is to be stored at cell site 110, processing flows to step 370 where cell site 110 stores the content. For example, cache unit 217 of cell site 110 may store the content prior to returning. However, if the content is not to be stored at cell site 110, process 300 finishes at the return step.

Figure 4:
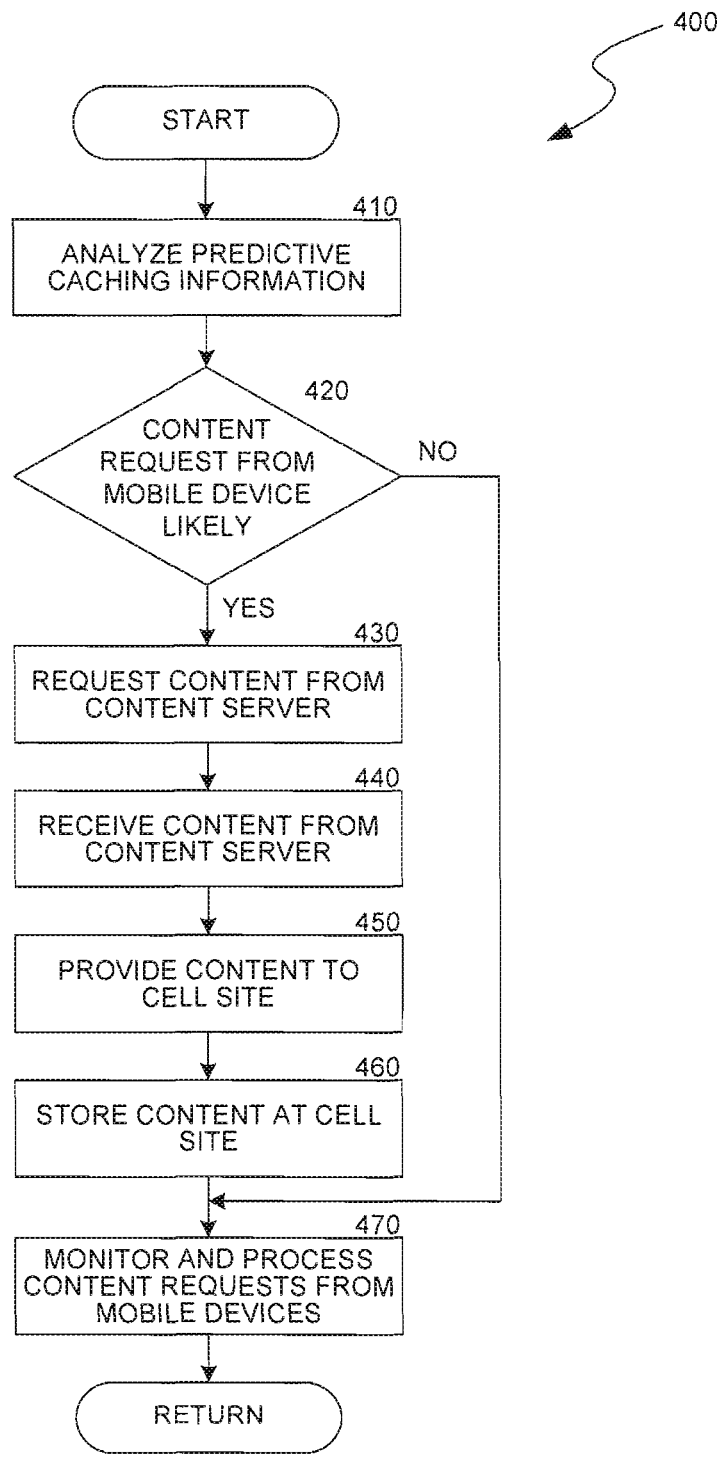
FIG. 4 is a logical flow diagram of a process for predictively caching content at a cell site.

FIG. 4 is a logical flow diagram of process 400 for predictively caching content at a cell site. For clarity, process 400 is described below as being performed by particular elements of environment 100 of FIG. 1 or communications system 290 of FIG. 2. However, process 400 may also be, for example, performed by other processors, by other elements, or in other systems whether or not such processors, elements, or systems are described herein. In addition, process 400 may be stored in nonvolatile memory.

Process 400 includes a process for predictively caching content at a cell site based, at least in part, on the likelihood that a mobile device will request the content. As one example, process 400 is primarily performed by content gateway 150. In this example, content may be "pushed" to cell sites by content gateway 150. However, the performance of process 400 and the steps thereof is not restricted in this manner. For example, cell sites may employ all or part of process 400 to "pull" and cache content.

Flowing from a starting block, processing begins at step 410 where content gateway 150 analyzes predictive caching information, For example, content gateway 150 may analyze any of the factors discussed above with respect to step 360 of FIG. 3. However, content gateway 150 may also employ any other techniques and/or analyze any other suitable factors. From step 410, processing flows to decision block 420.

At decision block 420 content gateway 150 determines whether a content request from a mobile device is likely. For example, this may include determining whether cell site 110 is likely to receive a request or multiple requests for the content within any undefined, predetermined, or dynamically defined time period. For example, content gateway 150 may employ the results from block 410 to determine whether a content request is likely within a predefined time such as the next 24 hours. In such an example, content gateway 150 may execute process 400 periodically to transfer content to cell site 110 over excess DTV spectrum. As one example, content gateway 150 may execute process 400 daily during the late night/early morning hours when, for example, excess DTV spectrum may be more readily available. However, the determination of decision block 420 may also be based, at least in part, on any number of factors.

Either manual or automatic likelihood determination may be included in decision block 420. If automatic determination is employed, any suitable logic, algorithms, machine learning, and/or the like may be employed to analyze factors such as those discussed above.

If a content request is not likely, processing flows to step 470. However, if a content request is likely, processing flows to step 430 where content gateway 150 requests the content from a content server via data network 160. Content gateway 150 may request the content from any of content servers 170, 172, and 174 over data network 160. From step 430, processing flows to step 440 where content gateway 150 receives the requested content from, for example, content server 170 over data network 160.

Content gateway 150 then provides the content to cell site 110 at step 450 to be stored at step 460. For example, content gateway 150 may provide the content to cell site 110 either via primary or ancillary channels. As one example, content gateway 150 provides the content to cell site 110 over an ancillary channel provided over the ancillary or supplementary services spectrum of the DTV spectrum. As discussed above, content gateway 150 may also employ logical and/or virtual channel techniques to transfer the content to cell site 110. Processing then flows to step 470.

At step 470, cell site 110 monitors and processes content requests from mobile devices. Step 470 may employ all or part of process 300 of FIG. 3. As one example, step 470 includes steps 310, 320, and 350 of process 300. Processing then returns to other actions.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The above Detailed Description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative combinations or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

I claim:

1. A system for providing digital content to a mobile device from a wireless communications service cell site, comprising:
    a content gateway configured to predictively receive and forward the digital content from a content server to the cell site over a wireless channel of a backhaul;
    a cache unit communicatively coupled to the content gateway and located at the cell site,
        wherein the cache unit is configured to locally cache the digital content; and
    the cell site configured to interface the mobile device to the backhaul,
        wherein the backhaul includes at least the wireless channel and a primary data channel communicatively coupling the cell site to a data network,
        wherein the cell site is further configured to provide locally cached digital content that is requested by the mobile device from the cache unit rather than by downloading the requested digital content over the backhaul,
        wherein the content gateway is configured to predictively receive and forward content based on whether a content request from the mobile device is likely to be received within a predetermined time period; and,
        wherein the backhaul includes another channel that is a logical or virtual channel provided over the primary data channel by employing at least one of quality of service, statistical multiplexing, or dynamic bandwidth allocation techniques.

2. The system of claim 1, wherein the wireless channel is provided in an ancillary or supplementary services spectrum of a digital television spectrum.

3. The system of claim 1, wherein the cell site is configured as a Global System for Mobile Communications (GSM) and Universal Mobile Telecommunications System (UMTS) cell site.

4. The system of claim 1, wherein the primary channel includes a primary data channel communicatively coupling the cell site to a data network and a primary voice channel coupling the cell site to a telephone network.

5. The system of claim 1, wherein the wireless channel is a point-to-multipoint channel provided in a frequency modulated (FM) radio sideband spectrum.

6. The system of claim 1, wherein the content includes at least one of image files, video files, or sound files.

7. The system of claim 1, wherein the content gateway is configured to predictively receive and forward content based on analysis of previous content requests.

8. The system of claim 1, wherein the content gateway is configured to predictively receive and forward content based on operator configurations.

9. The system of claim 1, wherein the content gateway is configured to predictively receive and forward content based on statistical analysis.

10. The system of claim 1, wherein the content gateway is configured to predictively receive and forward content based on available space in a cell site cache unit.

11. The system of claim 1, wherein the content gateway is configured to predictively receive and forward content based on network conditions.

12. The system of claim 1, wherein the content gateway is configured to predictively receive and forward content based on a size of the content.

13. The system of claim 1, wherein the content gateway is configured to predictively receive and forward content based on content requests at other cell sites.

14. The system of claim 1, further comprising:
a base station controller (BSC) coupled to the cell site and configured to control Global System for Mobile Communications (GSM) functionality of the cell site;
a Radio Network Controller (RNC) coupled to the cell site and configured to control Universal Mobile Telecommunications System (UMTS) functionality of the cell site; and
a switch coupled to the BSC and to the RNC and configured to switch voice traffic from the cell site and to route data traffic from the cell site to the data network, wherein the cell site comprises:
a base station configured to provide GSM radio interfacing between the backhaul and an antenna interface;
a Node-B configured to provide UMTS radio interfacing between the backhaul and the antenna interface;
a first antenna configured to interface the cell site to the mobile device;
a second antenna configured to interface the cell site to the content gateway; and
the antenna interface configured to couple RF signals between the base station, the Node-B, the first antenna, and the second antenna.

15. A method for providing content to mobile devices from wireless communications service cell sites, comprising:
receiving a content request from a mobile device;
determining whether the content is locally cached at a cell site;
if the content is locally cached at the cell site, providing the content to the mobile device from the local cache; and
if the content is not cached at the cell site, then:
requesting the content from a content server;
receiving the content from the content server; and
providing the received content to the mobile device,
wherein the receiving of the content from the content server includes predictively transferring the content to the cell site based on whether content requests from mobile devices are likely to be received within a predetermined time period,
wherein the transferring includes transferring the content over a logical or virtual channel of a backhaul, and,
wherein the backhaul includes another channel that is a logical or virtual channel provided over a primary data channel by employing at least one of quality of service, statistical multiplexing, or dynamic bandwidth allocation techniques.

16. The method of claim 15, further comprising:
determining whether to locally cache the received content at the cell site based, at least in part, on a likelihood of another request to provide the received content.

17. The method of claim 15, wherein the transferring further comprises:
predictively transferring the content to the cell site based on at least one of analysis of previous content requests, operator configurations, statistical analysis, available space in a cell site cache unit, network conditions, size of the content, or content requests at other cell sites.

18. The method of claim 15, further comprising:
transferring the content to the cell site over a point-to-multipoint wireless broadcast in a digital television spectrum.

19. The method of claim 15, wherein the transferring further comprises:
transferring the content to the cell site over a point-to-multipoint wireless broadcast channel in a frequency modulated (FM) radio sideband spectrum.

20. A computer-readable processor device for executing operations to provide content to a mobile device from a wireless communications service cell site, the operations comprising:
receiving a content request from the mobile device, wherein the content is not an email, a short message service message, a voice message, a multi-media service message, or a text message;
determining whether the content is locally cached at the cell site;
if the content is locally cached at the cell site, providing the content to the mobile device from the local cache; and
if the content is not cached at the cell site:
requesting the content from a content server;
receiving the content from the content server; and
providing the received content to the mobile device,
wherein the receiving of the content from the content server includes predictively transferring the content to the cell site based on whether content requests from mobile devices are likely within a predetermined time period,
wherein the transferring includes transferring the content over a logical or virtual ancillary channel of a backhaul, and,
wherein the backhaul includes another channel that is a logical or virtual channel provided over a primary data channel by employing at least one of quality of service, statistical multiplexing, or dynamic bandwidth allocation techniques.

21. The computer-readable processor device of claim 20, wherein the transferring further comprises:
predictively transferring the content to the cell site based, at least in part, on at least one of analysis of previous content requests, operator configurations, statistical analysis, available space in a cell site cache unit, network conditions, size of the content, or content requests at other cell sites.

22. The computer-readable processor device of claim 20, wherein the transferring further comprises:
transferring the content to the cell site and other cell sites in range over a point-to-multipoint wireless broadcast in a digital television spectrum.

* * * * *